United States Patent [19]

Akutsu et al.

[11] Patent Number: 4,944,980
[45] Date of Patent: Jul. 31, 1990

[54] OPTICAL RECORDING MATERIAL

[75] Inventors: Mitsuo Akutsu, Tokyo; Syuji Iwakura; Keiji Oya, both of Saitama, all of Japan

[73] Assignee: Adeka Argus Chemical Co., Ltd., Tokyo, Japan

[21] Appl. No.: 384,653

[22] Filed: Jul. 25, 1989

[30] Foreign Application Priority Data

Aug. 5, 1988 [JP] Japan .................. 63-195906

[51] Int. Cl.$^5$ ................................. B32B 3/00
[52] U.S. Cl. ......................... 428/64; 428/65; 428/199; 428/411.1; 428/913; 430/270; 430/945; 346/1.1; 346/76 L; 346/135.1; 369/288
[58] Field of Search ............... 430/270, 945; 528/149; 428/64, 65, 199, 411.1, 913; 346/1.1, 76 L, 135.1; 369/288

[56] References Cited

U.S. PATENT DOCUMENTS

| | | | |
|---|---|---|---|
| 4,626,496 | 12/1986 | Sato | 430/945 |
| 4,666,819 | 5/1987 | Elmasry | 430/945 |
| 4,680,375 | 7/1987 | Elmasry | 428/411.1 |
| 4,713,314 | 12/1987 | Namba et al. | 430/945 |
| 4,735,839 | 4/1988 | Soto et al. | 430/945 |
| 4,735,889 | 4/1988 | Namba et al. | 430/945 |
| 4,739,029 | 4/1988 | Elmary | 528/149 |
| 4,767,693 | 8/1988 | Oba et al. | 430/270 |
| 4,847,385 | 7/1989 | Kusakata et al. | 428/199 |
| 4,851,322 | 7/1989 | Inagaki et al. | 430/270 |

FOREIGN PATENT DOCUMENTS 59-55795  3/1984  Japan .
60-16269  8/1985  Japan .

Primary Examiner—Patrick Ryan
Attorney, Agent, or Firm—Frishauf Holtz Goodman & Woodward

[57] ABSTRACT

An optical recording material having excellent light stability, shelf stability and solubility in a solvent comprises, as an indispensable constituent, a compound of the following general formula:

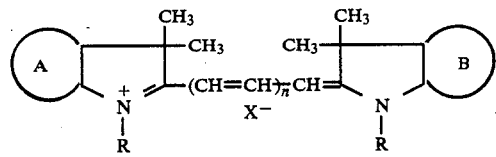

wherein R represents a cycloalkyl group having 3 to 12 carbon atoms, X$^-$ represents a halide anion, a perchlorate anion or a quencher anion, rings A and B each represent a benzene or naphthalene ring which may be substituted with a halogen atom, and n represents 1 to 4.

1 Claim, No Drawings

OPTICAL RECORDING MATERIAL

BACKGROUND OF THE INVENTION

1. Field of the Invention

The present invention relates to an optical recording material usable for producing an optical recording medium used for recording information as a thermal information pattern with a laser or the like. In particular, the present invention relates to an optical recording material usable for producing an optical recording medium with which high-density optical recording and regeneration are possible by using, for example, a laser having a low energy at a wavelength in the visible or near-infrared region.

2. Description of the Prior Art

Optical recording media are usually characterized in that they are neither abroaded nor damaged, since they are out of contact with a write head or read head. Particularly the optical recording media which thermally record information have an advantage that no development in a dark room is necessitated and, therefore, investigations are made for the purpose of developing such media.

Such an optical recording medium utilizes recording light as the heat source, and information can be recorded at a high density by, for example, forming optically detectable pits on a thin recording layer formed on a base.

Information is written on the recording medium by scanning the surface of the recording layer with focused laser beams to form pits on the recording layer which has absorbed the energy of the applied laser beams. The information recorded on the recording medium can be detected by reading the formed pits with a read light.

Examples of the recording layer of the optical recording medium used heretofore include, among others, an inorganic film such as a thin metallic film, e.g. an aluminum film formed by vapor deposition, a thin tellurium oxide film, a thin bismuth film or an amorphous chalcogenide glass film.

Such a thin film cannot be easily formed by a coating process and, therefore, a sputtering or vacuum deposition process was employed. However, this process necessitates a complicated operation disadvantageously. In addition, when the above-described inorganic substance is used, defects such as a high reflectance of the laser beams, a high thermal conductivity and a low utilization of the laser beams are inevitable.

Under these circumstances, a process has been proposed wherein an organic compound mainly comprising a dye capable of forming pits with a semiconductor laser is employed in place of the inorganic material for preparing the recording layer.

Known dyes usable for this purpose include cyanine dyes such as indolenine, thiazole, quinoline and selenazole dyes. These dyes are salts of a cyanine dye cation with an anion such as a halide anion or a perchlorate anion, among which indolenine dyes are particularly preferred, since they have a high sensitivity.

However, these cyanine dyes usually have an unsatisfactory light stability which is degraded after repeated regeneration. Therefore, Japanese Patent Laid-Open No. 55795/1984 proposed a process for improving the light stability by using a combination of the cyanine dye with a nickel quencher. Japanese Patent Laid-Open No. 162691/1985 proposed the use of a cyanine dye comprising a nickel quencher anion as the anion.

Although the light stability can be improved to some extent by these processes, it is yet unsatisfactory. Another defect of these cyanine dyes is that they have a poor shelf stability. For example, when they are stored in a humid atmosphere, their reflectance is lowered.

The recording medium comprising the cyanine dye as the recording material is prepared by dissolving the cyanine dye and, if necessary, a binder in an organic solvent, applying the solution to a substrate made of glass or plastic having a high transparency, such as polymethyl methacrylate or polycarbonate, and drying it. However, the ordinary cyanine dyes comprising the indolenine compound have a defect that their solubility in an organic solvent is insufficient for easily forming the coating film having a uniform thickness.

Under these circumstances, it has been eagerly demanded to develop a cyanine dye having excellent light stability, shelf stability and solubility in the solvent.

SUMMARY OF THE INVENTION

The present invention has been completed under the above-described circumstances. An object of the present invention is to provide cyanine dyes comprising an indolenine compound, being usable as an optical recording material for a recording layer of an optical recording medium and having excellent light stability, shelf stability and solubility in a solvent and a high sensitivity.

After intensive investigations made for the purpose of attaining the above-described object, the inventors have found that all of the problems described above can be solved by replacing a lower alkyl group such as a methyl, ethyl or butyl group bonded to the nitrogen atom of the ring of the cyanine dye (indolenine) cation with a cycloalkyl group.

Thus the present invention provides an optical recording material comprising, as an indispensable constituent, a compound of the following general formula:

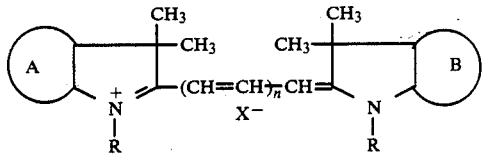

wherein R represents a cycloalkyl group having 3 to 12 carbon atoms, $X^-$ represents a halide anion, a perchlorate anion or a quencher anion, rings A and B each represent a benzene or naphthalene ring which may be substituted with a halogen atom, and n represents 1 to 4.

DETAILED DESCRIPTION OF THE INVENTION

Examples of the cycloalkyl group represented by R in the above general formula include cyclopropyl, cyclobutyl, cyclopentyl, cyclohexyl, cyclooctyl and cyclododecyl groups.

The halide anion represented by $X^-$ is, for example, a chloride, bromide, iodide or bromide anion. The quencher anion includes, for example, those described in Japanese Patent Laid-Open No. 234892/1985. Typical examples of the quencher anion include anions of the following formula:

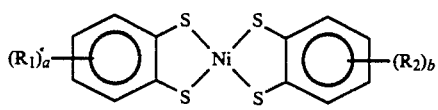

wherein $R_1$ and $R_2$ each represent an alkyl group or a halogen atom and a and b each represent a number of 0 to 3.

Typical examples of the cation of the cyanine dye comprising an indolenine compound include the following ones:

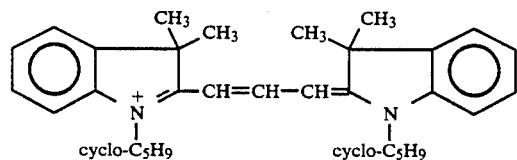 φ-1

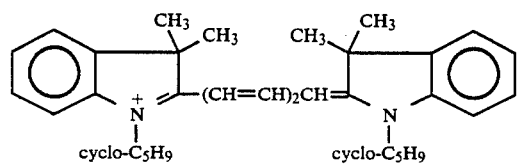 φ-2

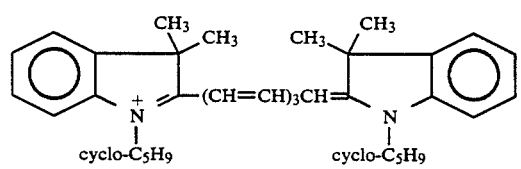 φ-3

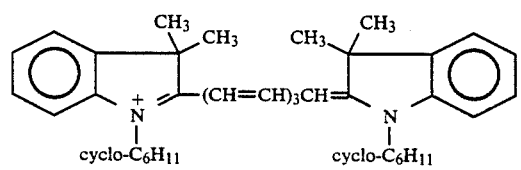 φ-4

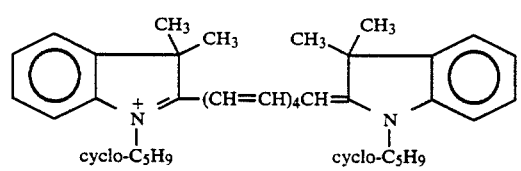 φ-5

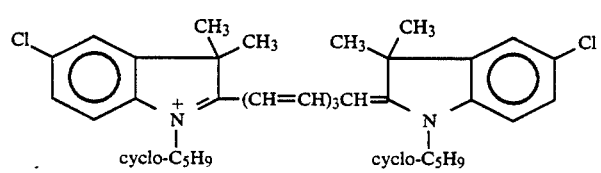 φ-6

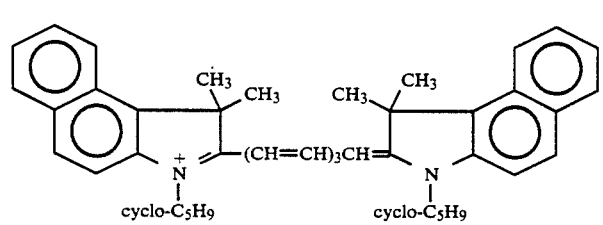 φ-7

Typical examples of the recording material (cyanine dyes comprising indolenines) are listed in the following Table 1:

TABLE 1

| No. | Cation | Anion |
|---|---|---|
| 1 | φ-3 | $CClO_4^-$ |
| 2 | φ-4 | $CClO_4^-$ |
| 3 | φ-6 | $I^-$ |
| 4 | φ-6 | $CClO_4^-$ |
| 5 | φ-7 | $CClO_4^-$ |
| 6 | φ-3 | nickel bis(3,4,6-trichloro-1,2-benzenedithiolate) |
| 7 | φ-4 | nickel bis(3,4,6-trichloro-1,2-benzenedithiolate) |
| 8 | φ-6 | nickel bis(3,4,6-trichloro-1,2-benzenedithiolate) |
| 9 | φ-7 | nickel bis(3,4,6-trichloro-1,2-benzenedithiolate) |
| 10 (Comparative) | 1,1',3,3,3',3'-hexamethyl-5,5'-dichloro-2,2'-indotricarbo- | $CClO_4^-$ |

TABLE 1-continued

| No. | Cation | Anion |
| --- | --- | --- |
| 11 (Comparative) | cyanine 1,1',3,3,3',3'-hexamethyl-5,5'-dichloro-2,2'-indotricarbocyanine | nickel bis(3,4,6-trichloro-1,2-benzenedithiolate) |

The recording material of the present invention comprises a salt of the cation of the cyanine (indolenine) dye with the halide anion, perchlorate anion or quencher anion and can be produced by a known process.

For example, the recording material can be produced by reacting a 2,3,3-trimethyl-3H-indole with a halogenated cycloalkane to form a 1-cycloalkyl-2,3,3-trimethyl-3H-indolyl halide and reacting the product with glutaconaldehyde dianil hydrochloride.

Typical examples of the process for preparing the compounds of the present invention will now be described.

PREPARATIVE EXAMPLE 1

Preparation of 1,1'-dicyclopentyl-3,3,3',3'-tetramethyl-5,5'-dichloro-2,2'-indotricarbocyanine iodiode (Dye No. 3):

A mixture of 19.4 g (0.1 mol) of 5-chloro-2,3,3-trimethyl-3H-indole with 58.8 g (0.3 mol) of iodocyclopentane was stirred at 100° C. for 6 h.

Precipitate thus formed were recovered by filtration and then washed with acetone to obtain 16.3 g of 5-chloro-1-cyclopentyl-2,3,3-trimethyl-3H-indolyl iodide.

15.6 g (0.04 mol) of the product and 5.7 g (0.02 mol) of glutaconaldehyde dianil hydrochloride were dissolved in a liquid mixture of 30 ml of dimethylformamide and 30 ml of acetic anhydride. 12 ml of pyridine was added to the solution. The mixture was stirred at 50° C. for 30 min. After cooling, 100 ml of diethyl ether was added thereto and then 100 ml of water was added dropwise thereto.

Precipitate thus formed were recovered by filtration and then recrystallized from ethanol to give 11 g of the product in the form of dark green powder.

The product was dissolved in ethanol and the absorbance thereof was determined to give the following results:

$\lambda_{max} = 760$ nm, $\epsilon = 3.4 \times 10^5$

In the infrared spectroscopic analysis, absorption bands were recognized at 2920 cm$^{-1}$ and 2850 cm$^{-1}$ to suggest the presence of the cyclopentane ring.

PREPARATIVE EXAMPLE 2

Preparation of 1,1'-dicyclopentyl-3,3,3',3'-tetramethyl-5,5'-dichloro-2,2'-indotricarbocyanine perchlorate (Dye No.4):

7.1 g (0.01 mol) of ϕ-6 iodide prepared in the Preparative Example 1 was dissolved in a mixture of 70 ml of acetone, 70 ml of methanol and 7 ml of water. A solution of 4.9 g (0.04 mol) of sodium perchlorate in 7 ml of water was added dropwise thereto.

After the completion of the addition followed by stirring at room temperature for 1 h, the product thus precipitated was recovered by filtration and recrystallized from ethanol to give the intended product in the form of dark green powder.

$\lambda_{max} = 760$ nm, $\epsilon = 2.9 \times 10^5$

PREPARATIVE EXAMPLE 3

Preparation of 1,1'-dicyclopentyl-3,3,3',3'-tetramethyl-5,5'-dichloro-2,2'-indotricarbocyanine/nickel bis(3,4,6-trichloro-1,2-benzenedithiolate) (Dye No.6):

A mixture of 7.1 g (0.01 mol) of ϕ-6 iodide prepared in the Preparative Example 1, 7.9 g (0.01 mol) of nickel bis(3,4,6-trichloro-1,2-benzenedithiolate) tetra-n-butylammonium and 500 ml of methanol was stirred under reflux for 3 h.

After cooling, precipitates thus formed were recovered by filtration and dried to obtain the intended product in the form of dark green powder.

The product was dissolved in ethanol and the absorbance thereof was determined to give the following results:

$\lambda_{max} = 764$ nm, $\epsilon = 1.6 \times 10^5$

The nickel content of the product was 5.19% which coincided with the calculated value (5/18%).

A recording layer can be formed from the optical recording material of the present invention by a known process. Usually, the optical recording material is dissolved in an organic solvent such as a lower alcohol, e.g., methanol or ethanol; a ketone, e.g., acetone, methyl ethyl ketone, methyl isobutyl ketone or cyclohexanone; an ester, e.g., ethyl acetate, butyl acetate or methoxyethyl acetate; a hydrocarbon, e.g., benzene, toluene or xylene; and a chlorinated hydrocarbon, e.g., methylene dichloride, dichloroethane or chloroform and the formed solution is applied to a base to form a recording layer easily. The recording material of the present invention has an improved solubility in an organic solvent, since it has a cycloalkyl substituent. Therefore, a coating solution having any desired concentration thereof can be prepared. This fact indicates not only that an excellent workability can be obtained but also that a uniform recording layer can be obtained without using any solvent which damages the plastic substrate.

The thickness of the recording layer is usually in the range of 0.001 to 10μ, preferably 0.01 to 5μ. The process for forming the recording layer is not particularly limited and, for example, an ordinary spin coating process can be employed.

The recording layer may contain, if necessary, a resin such as polyethylene, polyester, polystyrene or polycarbonate in addition to the compound of the present invention. It may contain also a quencher such as nickel bisdithiolate, a surfactant, antistatic agent, lubricant, flame retardant, stabilizer, dispersant, antioxidant and crosslinking agent.

The material of the base on which the recording layer is to be formed is not particularly limited so far as it is substantially transparent to the write light and read light. Examples thereof include resins such as polymethyl methacrylate, polyethylene terephthalate and polycarbonate, and glass. The form of the material is not limited and it may be tape, drum, belt or the like depending on the use thereof.

The following Examples will further illustrate the present invention, which by no means limit the invention.

EXAMPLE 1

A titanium chelate compound (T-50; a product of Nippon Soda Co., Ltd.) was applied to an acrylic disc base having a diameter of 30 cm and was then hydrolyzed to form an undercoat (0.01μ). A solution of a dye listed in Table 2 and nickel bis(3,4,6-trichloro-1,2-benzenedithiolate)tetra-n-butylammonium in a weight ratio of 1:1 in ethanol was applied thereto to form a recording layer having a thickness of 0.06μ.

Writing was conducted from rear surface of the substrate with a semiconductor laser (830 nm, output of pumping optics" 10 mW, frequency: 2 kHz) while the medium thus formed was rotated at 900 rpm.

Then C/N ratio was determined with a spectrum analyzer by detecting the reflected light through the substrate by using a semiconductor laser (830 nm, output of pumping optics: 1 mW) as the read light (band width: 30 kHz).

Changes in the reflectance (%) on the rear surface of the substrate were determined after the irradiation in a stationary state for 5 min and also after leaving it to stand at 40° C. at a relative humidity of 88% for 2500 h with 1-mW laser beams as the read light (pulse of 1 μsec width and 3 kHz).

The results are shown in Table 2.

TABLE 2

| Dye No. | C/N ratio (dB) | Changes in reflectance (%) | |
|---|---|---|---|
| | | after irradiation | after storage |
| 1 | 50 | −4 | −8 |
| 2 | 50 | −4 | −8 |
| 3 | 49 | −4 | −10 |
| 4 | 51 | −2 | −6 |
| 5 | 49 | −4 | −8 |
| 10 | 47 | −8 | −16 |

EXAMPLE 2

A titanium chelate compound (T-50; a product of Nippon Soda Co., ltd.) was applied to an acrylic disc base having a diameter of 30 cm and was then hydrolyzed to form an undercoat (0.01μ). A solution of a dye listed in Table 3 in ethanol was applied thereto to form a recording layer having a thickness of 0.06μ.

The medium thus formed was subjected to the same tests as those of Example 1.

The results are shown in Table 3.

TABLE 3

| Dye No. | C/N ratio (dB) | Changes in reflectance (%) | |
|---|---|---|---|
| | | after irradiation | after storage |
| 6 | 51 | −4 | −6 |
| 7 | 51 | −4 | −6 |
| 8 | 53 | −2 | −4 |
| 9 | 50 | −4 | −6 |
| 11 | 48 | −8 | −12 |

It is apparent from the results of Examples 1 and 2 that when the indolenine compound having a cycloalkyl substituent is used as the cyanine dye according to the present invention, a reduction in the reflectance after irradiation or storage is far smaller than that caused when an ordinary dye having only an alkyl substituent is used. Thus the present invention is quite excellent.

What is claimed is:

1. An optical recording material comprising, as an indispensable constituent, a compound of the following general formula:

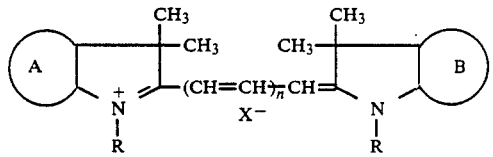

wherein R represents a cycloalkyl group having 3 to 12 carbon atoms, X$^-$ represents a halide anion, a perchlorate anion or a nickel bisdithiolate anion, rings A and B each represent a benzene or naphthalene ring which may be substituted with halogen atom, and n represents 1 to 4.

* * * * *